United States Patent
Zhang

(10) Patent No.: US 9,917,906 B2
(45) Date of Patent: Mar. 13, 2018

(54) METHODS AND SYSTEMS FOR MANAGING A TASK BASED ON GEOGRAPHICAL LOCATIONS

(71) Applicant: Tencent Technology (Shenzhen) Company Limited, Shenzhen (CN)

(72) Inventor: Shaofeng Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 346 days.

(21) Appl. No.: 14/615,332

(22) Filed: Feb. 5, 2015

(65) Prior Publication Data

US 2015/0156267 A1 Jun. 4, 2015

Related U.S. Application Data

(63) Continuation of application No. PCT/CN2014/082784, filed on Jul. 23, 2014.

(30) Foreign Application Priority Data

Sep. 2, 2013 (CN) .......................... 2013 1 0392777

(51) Int. Cl.
*H04L 29/08* (2006.01)
*H04W 4/02* (2018.01)
*H04W 4/20* (2018.01)

(52) U.S. Cl.
CPC .............. *H04L 67/18* (2013.01); *H04L 67/02* (2013.01); *H04W 4/02* (2013.01); *H04W 4/023* (2013.01); *H04W 4/206* (2013.01)

(58) Field of Classification Search
CPC ................................ H04L 67/18; H04L 67/02
(Continued)

(56) References Cited

U.S. PATENT DOCUMENTS 7,471,946 B2 12/2008 Adamczyk et al.
8,790,185 B1 * 7/2014 Caldarone ............... A63F 13/10
463/39
(Continued)

FOREIGN PATENT DOCUMENTS

CN 1866867 A 11/2006
CN 102340734 A 2/2012

OTHER PUBLICATIONS

"Verification of task completion across a communications network"—Gray et al, Kainos Software LTD., Jul. 2006 http://www.google.la/patents/US20060206895.*

(Continued)

*Primary Examiner* — Randy Scott
(74) *Attorney, Agent, or Firm* — Morgan, Lewis & Bockius LLP

(57) ABSTRACT

The present application discloses a location based task management method. A computational device obtains first location information concerning one or more geographical locations where a first client device has been located, and assigns a task to the first client device based on the one or more geographical locations. The task includes a task performance location. The computational device then receives from the first client device a first message that includes second location information corresponding to the task performance location and at least one additional information item. The at least one additional information item is captured by first client device at or near the task performance location after completing the task. The progress of the task is then managed based on the second location information, the at least one additional information item and a time difference between the assignment of the task and the receipt of the first message.

20 Claims, 10 Drawing Sheets

(58) Field of Classification Search
USPC .... 709/223, 224, 226, 227; 705/14.1, 14.16, 705/44
See application file for complete search history.

(56) References Cited

U.S. PATENT DOCUMENTS

| | | | |
|---|---|---|---|
| 2011/0093349 A1* | 4/2011 | Drescher | G06Q 30/00 705/14.73 |
| 2013/0018701 A1* | 1/2013 | Dusig | G06Q 30/02 705/7.32 |
| 2013/0090969 A1* | 4/2013 | Rivere | G06Q 10/06 705/7.19 |
| 2013/0239140 A1* | 9/2013 | Demirtshian | H04N 5/44513 725/37 |

OTHER PUBLICATIONS

Tencent Technology, ISRWO, PCT/CN2014/082784, dated Oct. 29, 2014, 6 pgs.

Tencent Technology, IPRP, PCT/CN2014/082784, dated Mar. 8, 2016, 4 pgs.

* cited by examiner

At a computational machine having one or more processors and memory storing program modules to be executed by the one or more processors: ⟵ 110

- Obtain first location information concerning one or more geographical locations where a first client device has been located 102

- Assign a task to the first client device according to the one or more geographical locations of the first client device, the task including a task performance location 104

- Regularly receive from the first client device an update of its current geographical location, wherein the progress of the task is further managed by monitoring the update of the current geographical location of the first client device 112
  - Regularly receive from the second client device an update of its current geographical location 112A
  - Manage the progress of the task by monitoring the updates of the current geographical locations of the first client device and the second client device 112B (B)

- Receive a first message from the first client device, wherein the first message includes second location information corresponding to the task performance location and at least one additional information item, wherein the at least one additional information item is captured by the first client device at or near the task performance location after completing the task 106
  - At least one additional information item is selected from a message group consisting of a text message, a voice message, a barcode, a quick response (QR) code, and a picture 106A
  - At least one additional information item is associated with the quality of the task that has been completed by the user of the first client at task performance location 106B (A)

FIG. 1B

METHODS AND SYSTEMS FOR MANAGING A TASK BASED ON GEOGRAPHICAL LOCATIONS

RELATED APPLICATIONS

This application is a continuation application of PCT Patent Application No. PCT/CN2014/082784, entitled "METHODS AND SYSTEMS FOR MANAGING A TASK BASED ON GEOGRAPHICAL LOCATIONS" filed on Jul. 23, 2014, which claims priority to Chinese Patent Application No. 201310392777.2, entitled "METHOD AND APPARATUS FOR SHARING TERMINAL LOCATIONS," filed on Sep. 2, 2013, both of which are incorporated by reference in their entirety.

TECHNICAL FIELD

The disclosed implementations relate generally to information technology, and in particular, to methods, devices and computer readable storage media for sharing location information of client devices and managing tasks according to the location information.

BACKGROUND

Information that is exchanged in a social network environment mainly includes texts and images. Once it is posted by a user on a social network platform, textual and pictorial information is open for browse by friends of this user.

Despite their acceptable performance on information exchange, existing social network platforms are plagued with some technical limitations. Under many circumstances, a user may only check the textual and pictorial information published by his friends, while other information (e.g., location information of the user and his friends) is generally unavailable. Even if the other information is available, such information is normally tied with the posts that include the textual and pictorial information. For example, location information concerning a user's geographical locations is normally unavailable, and if available, is updated only when the user uploads the posted textual and pictorial information. Thus, when a user reads a friend's posts, the user captures geographical locations where the friend was previously located at the time of publishing the posts, and cannot identify where the friend is currently located. As a result, due to the tie between the location information and the posts, the user may have difficulty in tracking current locations of his friends in real time in the social network environment.

SUMMARY

The above deficiencies and other problems associated with the conventional approaches of sharing location information on a social network platform are reduced or eliminated by the application disclosed below. In some embodiments, the application is implemented in a computational device that has one or more processors, memory and one or more modules, programs or sets of instructions stored in the memory for performing multiple functions. Instructions for performing these functions may be included in a computer program product configured for execution by one or more processors.

One aspect of the application is a method of managing a task based on geographical locations. The method includes obtaining first location information concerning one or more geographical locations where a first client device has been located, and assigning a task to the first client device according to the one or more geographical locations of the first client device. The task includes a task performance location. The method further includes receiving a first message from the first client device. The first message includes second location information corresponding to the task performance location and at least one additional information item. The at least one additional information item is captured by the first client device at or near the task performance location after completing the task. The method of managing the task further includes managing the progress of the task based on the second location information, the at least one additional information item and a time difference between the assignment of the task and the receipt of the first message.

Another aspect of the application is a computational device that includes one or more processors and memory having at least one program (including instructions) stored thereon, which when executed by the one or more processors cause the processors to perform operations to obtain first location information concerning one or more geographical locations where a first client device has been located, and assign a task to the first client device according to the one or more geographical locations of the first client device. The task includes a task performance location. The at least one program further includes instructions to receive a first message from the first client device. The first message includes second location information corresponding to the task performance location and at least one additional information item. The at least one additional information item is captured by the first client device at or near the task performance location after completing the task. The at least one program further includes instructions to manage the progress of the task based on the second location information, the at least one additional information item and a time difference between the assignment of the task and the receipt of the first message.

Another aspect of the application is a non-transitory computer readable storage medium storing at least one program configured for execution by at least one processor of a computational device. The at least one program includes instructions to obtain first location information concerning one or more geographical locations where a first client device has been located, and assign a task to the first client device according to the one or more geographical locations of the first client device. The task includes a task performance location. The at least one program further includes instructions to receive a first message from the first client device. The first message includes second location information corresponding to the task performance location and at least one additional information item. The at least one additional information item is captured by the first client device at or near the task performance location after completing the task. The at least one program further includes instructions to manage the progress of the task based on the second location information, the at least one additional information item and a time difference between the assignment of the task and the receipt of the first message.

Other embodiments and advantages may be apparent to those skilled in the art in light of the descriptions and drawings in this specification.

BRIEF DESCRIPTION OF DRAWINGS

The aforementioned implementation of the present application as well as additional implementations will be more clearly understood as a result of the following detailed description of the various aspects of the present application when taken in conjunction with the drawings.

FIGS. 1B-1D illustrate a flow diagram representing a method for sharing location information and managing a task in accordance with some embodiments.

Like reference numerals refer to corresponding parts throughout the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. The appended drawings, however, merely illustrate the more pertinent features of the present disclosure and are therefore not to be considered limiting, for the description may admit to other effective features. In other instances, well-known methods, procedures, components, and circuits have not been described in detail so as not to unnecessarily obscure aspects of the embodiments.

The technical scheme of the embodiment of the application will now be described in connection with the accompanying drawings in the embodiments of the application. Obviously, some but not all embodiments of the application are described. Based on the embodiments of the application, other embodiments obtained by people having ordinary skill in the art are also included in the protective scope of the application.

Figure 1A:
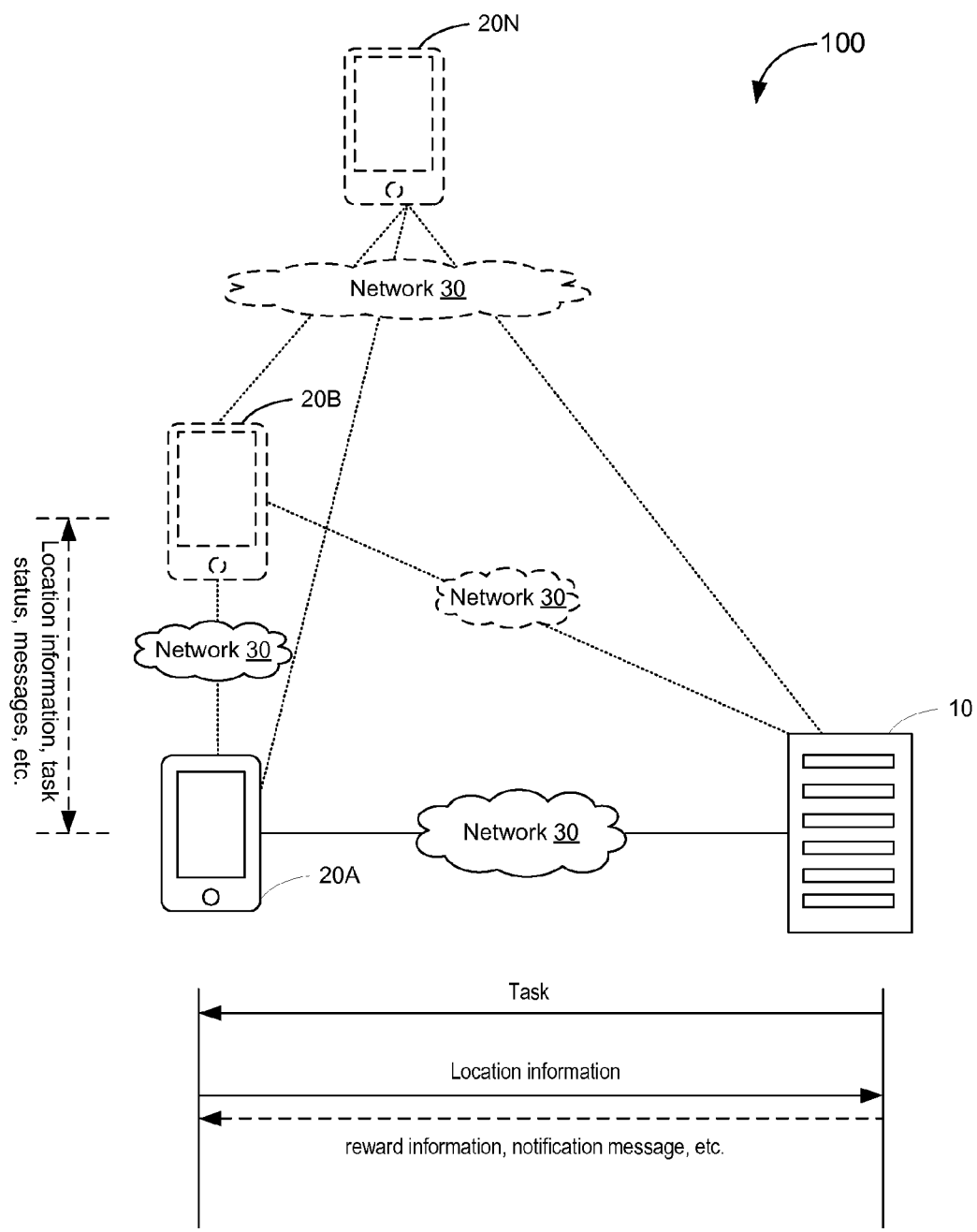
FIG. 1A illustrates a schematic diagram of a location sharing system that includes a server and one or more client devices in accordance with some embodiments.

FIG. 1A illustrates a schematic diagram of a location information sharing system 100 that includes a server 10 and one or more client devices 20 (e.g., client devices 20A, 20B, . . . , and 20N) in accordance with some embodiments. Server 10 and client devices 20 are communicatively coupled to each other via one or more networks 30. Networks 30 have one or more type of topologies, including but not limited to the Internet, intranets, local area networks (LANs), cellular networks, Ethernet, Storage Area Networks (SANs), telephone networks, Bluetooth personal area networks (PAN) and the like.

In some implementations, a client device (e.g., client device 20A) identifies its geographical locations and report corresponding location information to server 10. Optionally, client device 20A reports the location information to server 10 regularly at a specific frequency or reports the location information in response to a request issued by server 10. In accordance with the geographical locations obtained from the reported location information, server 10 assigns a task to client device 20A. During the course of implementing the task and upon completion of the task, client device 20A updates to server 10 its location information and additional information items, such as an image and a message. According to the updated location information and the additional information items, server 10 determines a reward attribute and/or a notification message associated with client device 20A.

In some implementations, server 10 exchanges information with one or more client devices 20 (e.g., client devices 20A and 20B). Specifically, server 10 assigns a task to the one or more client devices 20 which work together to implement the task. In some embodiments, server 10 assigns a subtask of the task to each of the one or more client devices 20. In some embodiments, server 10 identifies one of the one or more client devices 20 as a managing client device that further assigns the subtasks of the task to the other client devices 20 and manages the progress of the subtasks. During the course of implementing the task and upon completion of the task, client devices 20 update their respective progress information (such as location information and additional information items) to server 10. Alternatively, client devices 20 exchange information between each other to update their peer devices or managing devices on the progress information.

In various embodiments of the application, a client device 20 is optionally a desktop computer, a laptop computer, a personal digital assistant (PDA), a tablet computer, a mobile phone or the like. Client devices 20 use different technology to identify their own geographical locations. In some embodiments, client devices 20 are assigned with unique Internet Protocol (IP) addresses, and their locations are identified according to their IP addresses. In some embodiments, client devices 20 are mobile devices, and their locations are determined with respect to those of base stations based on power levels measured at the base stations. In some embodiments, locations of client devices 20 are determined according to satellite signals of a Global Positioning System (GPS). In some embodiments, Wi-Fi data of client devices 20 are used to determine the locations of client devices 20. One of those skilled in the art knows that the aforementioned techniques are merely exemplary methods for identifying the locations of client devices 20, and that they not intended to limit the scope of the application.

Figure 1C:
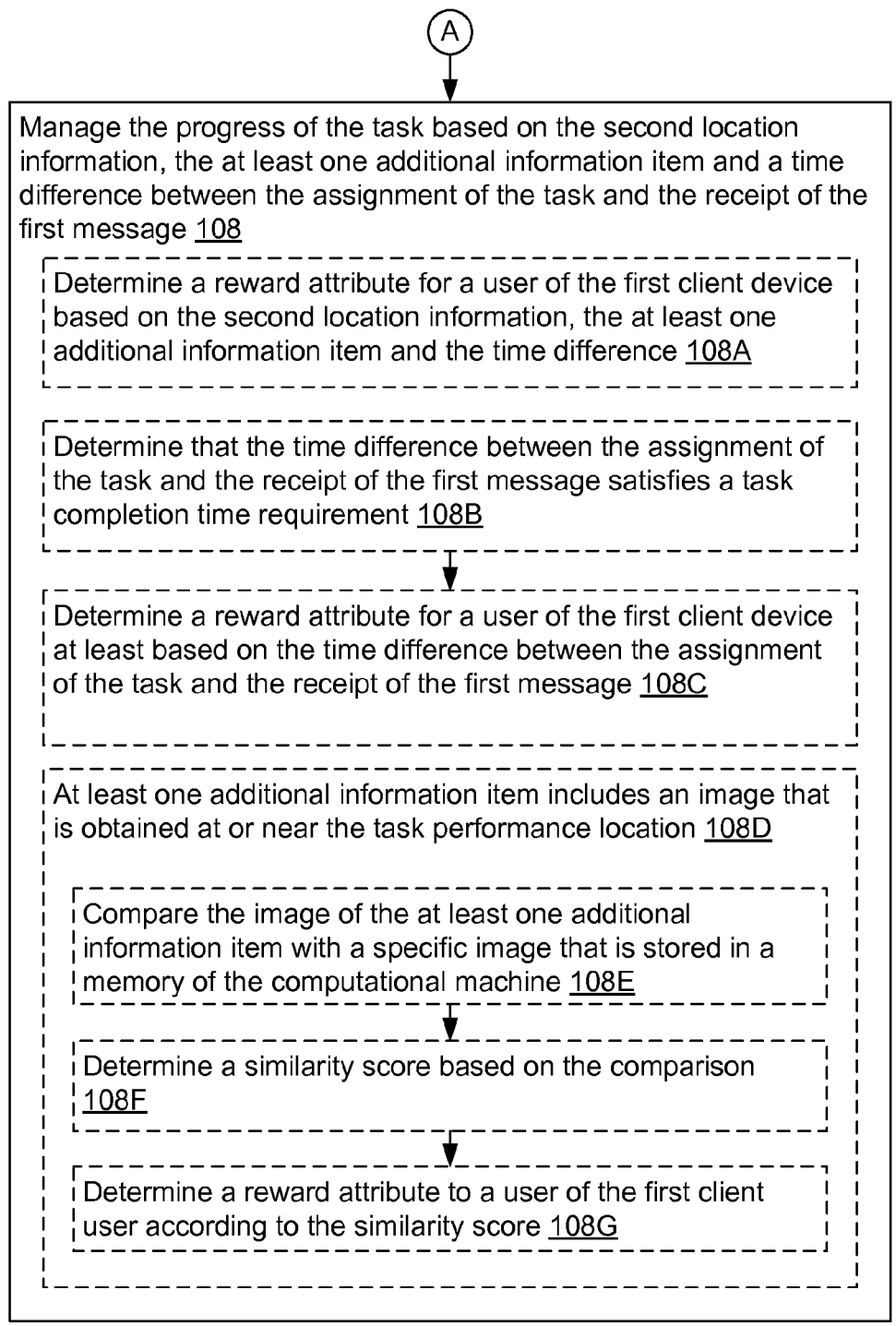
Figure 1D:
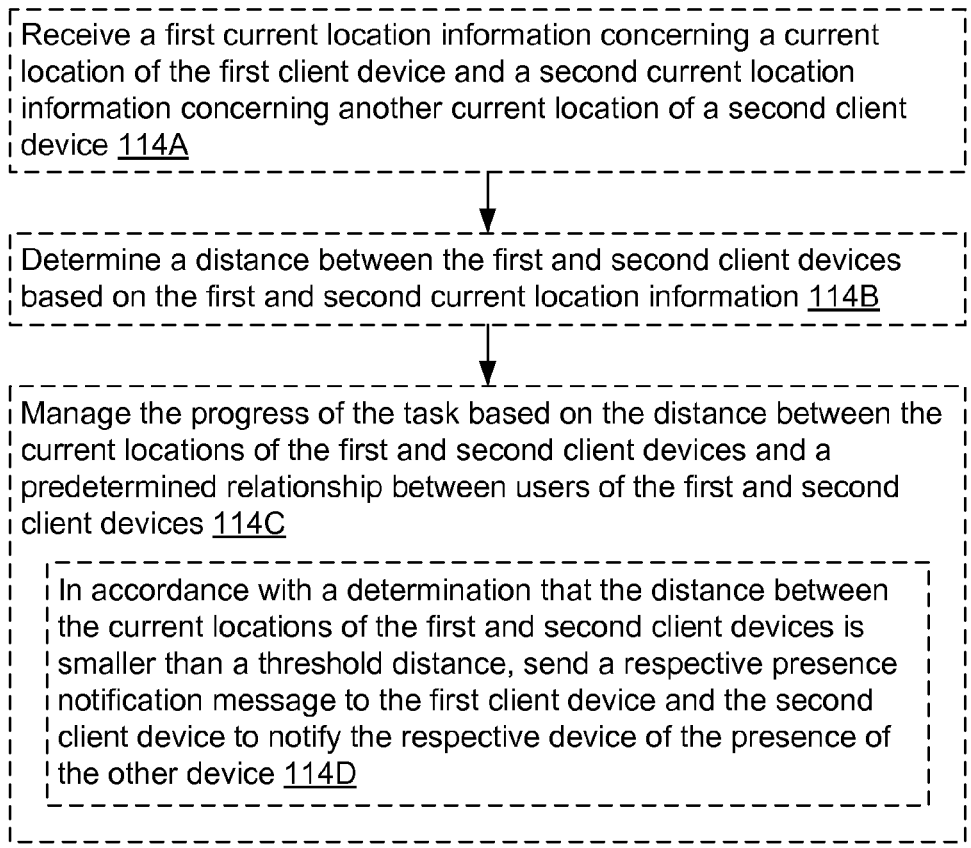

FIGS. 1B-1D illustrate a flow diagram representing a method 110 for sharing location information and managing a task in accordance with some embodiments. Method 110 is performed at a computational device (e.g., server 10 and client device 20) having one or more processors and memory storing program modules to be executed by the one or more processors. Specifically, method 110 is performed by a server or a client device (e.g., a mobile device) to manage a task based on geographical locations of client devices 20 whose users need to implement the task in real life. When the computational device is server 10, it receives geographical location information from one or more client devices 20 and manages a task that is assigned to be completed by users of the one or more client devices 20. However, when the computational device is client device 20 (i.e., a managing client device), it is configured to receive geographical location information from one or more other client devices 20 and manage a task that is assigned to be completed by users of the one or more other client devices 20.

The computational device obtains (102) first location information concerning one or more geographical locations where a first client device has been located, and assigns (104) a task to the first client device according to the one or more geographical locations of the first client device. The task includes a task performance location.

The computational device further receives (106) a first message from the first client device. The first message includes second location information corresponding to the task performance location and at least one additional information item, and the at least one additional information item is captured by the first client device at or near the task performance location after completing the task. In some embodiments, the at least one additional information item is selected (106A) from a message group consisting of a text message, a voice message, a barcode, a quick response (QR) code, and a picture.

In a specific example, a user of the first client device is allowed to scan a barcode only when he or she completed the assigned task. The at least one additional information item is optionally associated (106B) with the quality of the task that has been completed by the user of the first client at the task performance location. In some situations, a manager monitors the quality of the task at the task performance location, and when the user completes the task, provides different barcodes for the client device to capture based on the quality of the task.

The computational device then manages (108) the progress of the task based on the second location information, the at least one additional information item and a time difference between the assignment of the task and the receipt of the first message. In some embodiments, the computational device manages the progress of the task by determining (108A) a reward attribute for a user of the first client device based on the second location information, the at least one additional information item and the time difference between the assignment of the task and the receipt of the first message.

Generally, the time difference between the assignment of the task and the receipt of the first message is associated with the time duration used by the user of the first client device to complete the assigned task. In some embodiments, it is determined (108B) whether this time difference satisfies a task completion time requirement. The computational device further determines (108C) a reward attribute for a user of the first client device at least based on the time difference between the assignment of the task and the receipt of the first message. A user who has completed the assigned task with a shorter time duration is often awarded with a higher reward attribute.

In some embodiments, the at least one additional information item includes (108D) an image that is obtained at or near the task performance location. For managing the progress of the task, the computational device compares (108E) the image of the at least one additional information item with a specific image that is stored in a memory of the computational device, determines (108F) a similarity score based on the comparison result, and determines (108G) a reward attribute for a user of the first client user according to the similarity score.

In some implementations, in addition to monitoring the completion of the assigned task, the computational device also monitors the progress of the assigned tasking during the course of implementing the task. For example, the computational device regularly receives (112) from the first client device an update of its current geographical location, and the progress of the task is thereby managed by monitoring this update of the current geographical location of the first client device.

In some implementations, a subtask of the task is assigned to a second client device, such that the first client device and the second client device work together to implement the task. An update of a current geographical location is received (112A) regularly from the first client device and the second client device, respectively. The computational device manages (112B) the progress of the task by monitoring the updates of the current geographical locations of the first client device and the second client device. Specifically, in some implementations not reflected in FIGS. 1A-1D, the computational device determines that the first client device is located within a first predetermined region according to location information received from the first client device, and that the second client device is located within a second predetermined region according to location information received from the second client device. Then, the computational device manages the progress of the task by updating reward attributes associated with the users of the first and second client devices.

In some embodiments, a subtask of the task is assigned to a second client device, and the first and second client devices exchanges an information item that is selected from an information group consisting of a text message, a voice message, and a picture.

In some implementations, the computational device receives (114A) first current location information concerning a current location of the first client device, and second current location information concerning another current location of a second client device. A distance is determined (114B) between the first and second client devices based on the first and second current location information. Then, the progress of the task is managed (114C) based on the distance between the current locations of the first and second client devices and a predetermined relationship between users of the first and second client devices. Further, in some embodiments, in accordance with a determination that the distance between the current locations of the first and second client devices is smaller than a threshold distance, a respective presence notification message is sent (114D) to the first client device and the second client device to notify the respective device of the presence of the other device.

Figure 2:
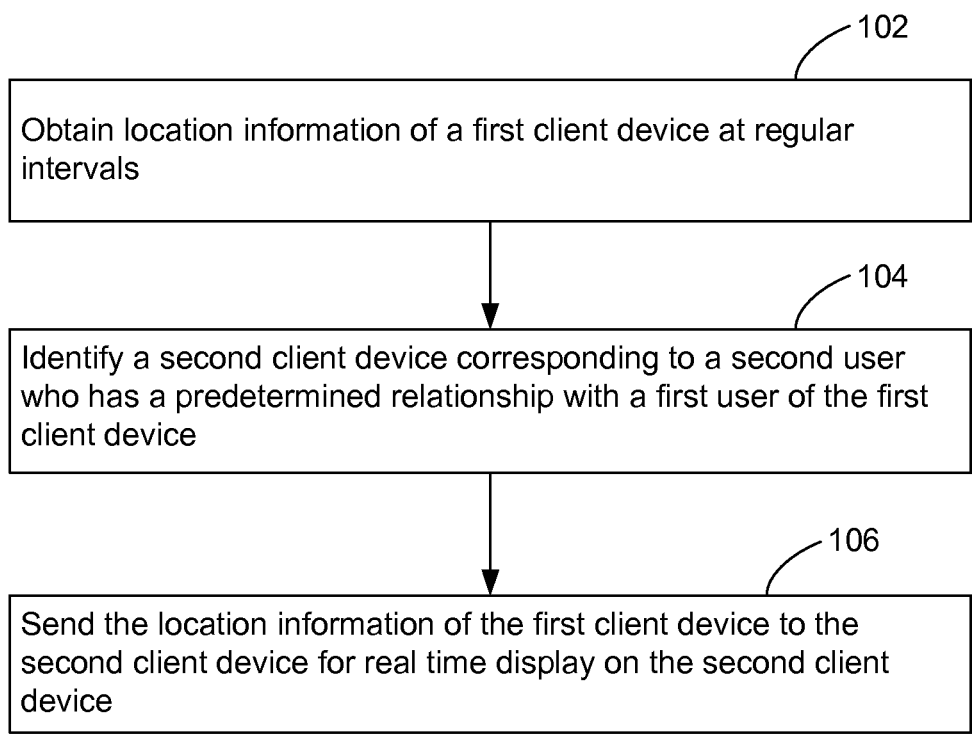
FIG. 2 illustrates a flow chart of a method for sharing location information of a client device in accordance with some embodiments.

FIG. 2 illustrates a flow chart of a method 200 for sharing location information of a client device 20 in accordance with some embodiments. Method 200 is optionally performed by a computational device, such as a server 10 and a client device 20A, to assign and manage a task based on the corresponding location information. At Step 102, positioning information of a first client device 20A is obtained at regular intervals. In some embodiments, a first client device 20A obtains the positioning information, such as its longitude and latitude, using a GPS receiver included in first client device 20. The longitude and latitude information is used by first client device 20A to calculate its own location information (e.g., coordinate positions of first client device 20A on an electronic map). In some implementations, after obtaining the location information, first client device 20A immediately uploads the location information to server 10, so that server 10 may obtain the location information of first client device 20A in real time.

In some embodiments, the positioning information of first client device 20A is received by server 10 at regular intervals, and used to determine the geographical locations of first client device 20A on the electronic map. Specifically, in one example, first client device 20A obtains its positioning information (e.g., longitude and latitude information) in real time, and sends the longitude and latitude information to server 10. Then, server 10 converts the longitude and latitude information to corresponding coordinate positions, and identifies the geographical locations of first client device 20A on an electronic map.

At Step 104, the computational device identifies a second client device 20B. Second client device 20B is used by a second user who has a predetermined relationship with a first user of first client device 20A. Exemplary predetermined relationships include a friend relationship established on a social network platform.

It should be noted that "first", "second" is used herein to describe various elements and distinguish one element from the other element, and that the various elements are not limited by these terms. For example, first client device 20A may be referred to as second client device 20B without departing from the scope of the application, and similarly second client device 20B may be referred to as first client device 20A, as far as first client device 20A and second client device 20B are two distinct client devices 20. Likewise, a first user and a second user do not refer specifically to someone, but broadly refer to user identities stored in server 10 and used for identifying two distinct users of client devices 20.

In some embodiments, a relationship chain is stored in server 10 for each user. Users who have relationships with a specific user may be identified based on a relationship chain associated with the specific user. Here, server 10 identifies the second user who has a predetermined relationship with the first user of first client device 20A, and in one specific example, the second user is a friend of the first user as determined by a corresponding friend relationship chain of the first user. In accordance with the predetermined relationship, the second user is optionally a friend in an instant message application, a friend or follower on a social network platform, a listener of a Weibo broadcast or the like.

In some embodiments, each of the first and second users is associated with a respective user account. Server 10 associates the predetermined relationships with the user accounts of the first and second users, and stores information concerning the predetermined relationships in a memory. Further, server 10 optionally associates the user accounts with the corresponding first and second client devices. Therefore, when the users log into the corresponding user accounts in distinct client devices 20, server 10 would associate the users' predetermined relationship with client devices 20.

Step 106, the location information of first client device 20A is sent to second client device 20B for real time display on second client device 20B. Specifically, in some embodiments, upon receiving the location information from first client device 20A, server 10 sends the coordinate position of first client device 20A on the electronic map to second client device 20B, and second client device 20B identifies (displays) first client device 20A on the electronic map based on the coordinate position. In a specific example, the location of first client device 20A is identified on the electronic map by an icon having a raindrop shape. In some implementations, the location information of first client device 20A is obtained at regular intervals, such that the location information of first client device 20A displayed on second client device 20A is refreshed at regular intervals. As such, second client device 20B displays and updates the current location of first client device 20A in real time.

In various embodiments of the application, examples of client devices 20 include, but are not limited to, a desktop computer, a laptop computer, a personal digital assistant, a tablet computer, a smart phone, an e-book reader, a MP3 (Moving Picture Experts Group Audio Layer III) player, a MP4 (Moving Picture Experts Group Audio Layer IV) player, a point-of-sale client device 20 and a vehicle-mounted computer.

Further, in various embodiments of the application, the location of first client device 20A is optionally displayed on second client device 20B in real time, and a user of a client device 20 may track the current location of his or her friend in real time without checking the social information (e.g., the messages, texts and pictures) posted on a social network application by his or her friends. Such geographical location information allows a user of a computational device (e.g., server 10 or client device 20) to use such location information to assign and manage a task among other users who are related to the user.

In some embodiments, location tracking and task management are integrated on an existing social network platform (e.g., WeChat, Facebook, and WhatsApp).

Figure 3:
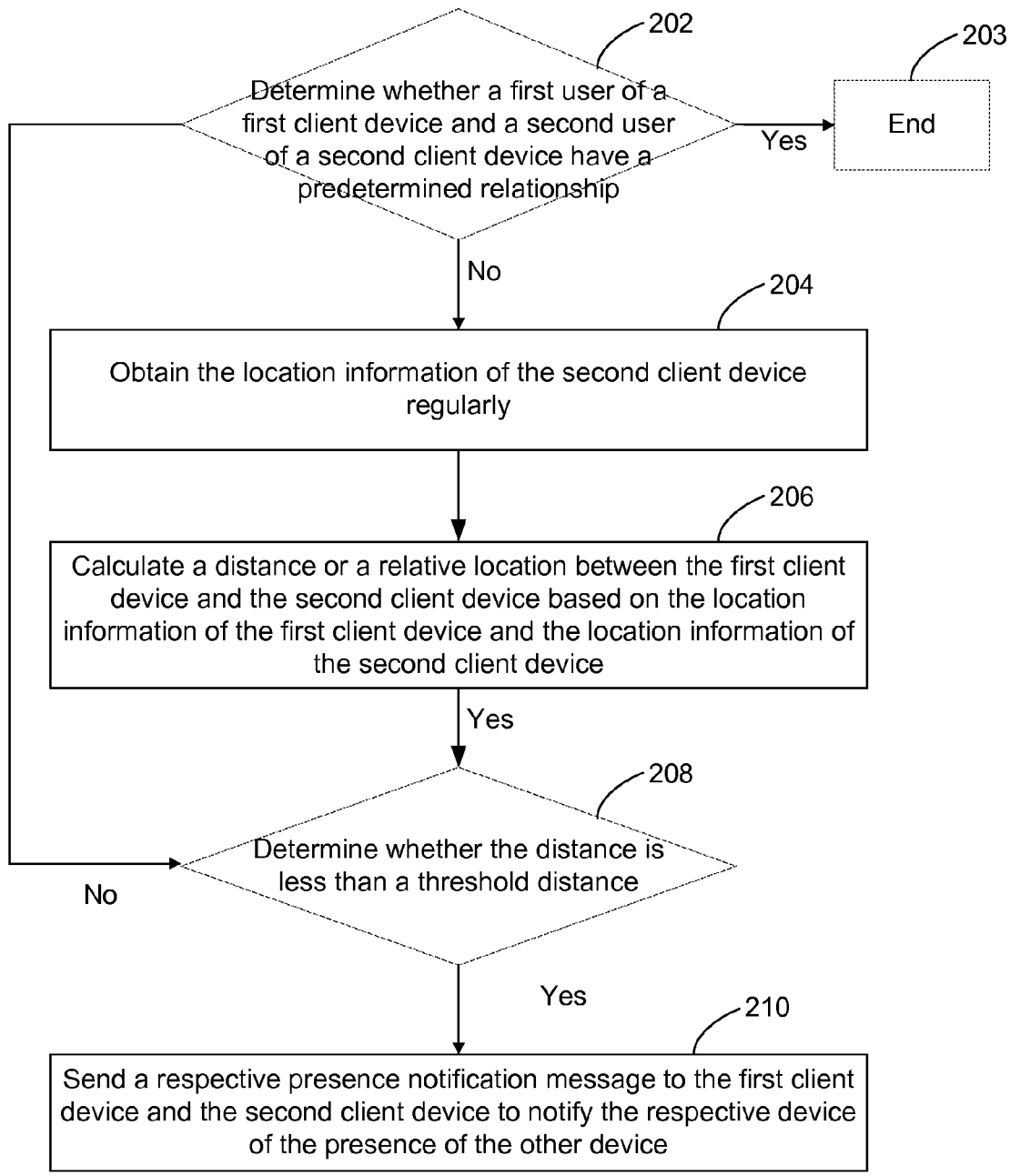
FIG. 3 illustrates a flow chart of a method for tracking geographical locations of client devices in accordance with some embodiments.

FIG. 3 illustrates a flow chart of a method 300 for tracking geographical locations of client devices in accordance with some embodiments. Method 300 is optionally performed by a computational device, such as server 10 and client device 20 (e.g., a managing client device). At Step 202, it is determined (202) whether a first user of a first client device 20A and a second user of a second client device 20B have a predetermined relationship.

On one hand, in accordance with a determination that the first and second users have a predetermined relationship, the location tracking process 100 is terminated (203). Specifically, in some implementations, the predetermined relationship may be a relationship in which the geographical locations of the users of first and second client devices 20 are in the same physical region. Examples of the predetermined relationship include colleagues, spouses, and siblings in real life. Therefore, if the users having the relationship are usually located in the same physical region (e.g., colleagues are located in the same office), therefore is no need to track and update the geographical locations of the users having such a relationship, and the geographical location tracking function is preferably disabled.

On the other hand, in accordance with a determination that the first and second users do not have the predetermined relationship, the computational device obtains (204) the location information of second client device 20B regularly. Optionally, the location information of second client device 20B include original positioning information captured by a GPS device and/or the coordinate position information on an electronic map that are converted from the original positioning information.

Step 206, the computational device further calculates (206) a distance or a relative location between first client device 20A and second client device 20B based on the location information of first client device 20A and the location information of second client device 20B.

In a specific example, a distance and a relative location between the first and second client devices are calculated based on the longitude and latitude information of first client device 20A and second client device 20B. The relative location between the first and second client devices includes a direction on which the first and second client devices are located with respect to each other.

Step 208, it is determined whether the distance is less than a threshold distance. In some embodiments, the threshold distance is a fixed distance predetermined by the computational device, and in some embodiments, the threshold distance is determined by the second user and uploaded by second client device 20A to the computational device. In some implementations, the location information of first client device 20A and the location information of second client device 20A are obtained at regular intervals, and it is determined in real time whether the distance between first client device 20A and second client device 20B is less than the threshold distance.

A determination that the distance is less than the threshold distance indicates that first client device 20A is located near second client device 20A and that the first and second client devices should be notified of their proximity. Therefore, at Step 210, the computational device sends a respective presence notification message to the first and second client devices to notify the respective device of the presence of the other device. In some embodiments, the computation device sends the presence notification message to first client device 20A which further generates another presence notification message and sends it to second client device 20B.

In some embodiments, the presence notification message generated by the computational device (e.g., server 10) includes the distance or the relative location between first client device 20A and second client device 20B. For example, the presence notification message includes a text message or a voice message that says "your friend John Doe is located 300 meters away to your west." Further, server 10 may send the presence notification message to both first client device 20A and second client device 20B. As such, when first client device 20A and second client device 20B are located close to each other, both first client device 20A and client device 20B obtain the location of the other client device in a timely manner.

In some embodiments, first client device 20A is determined to be located substantially close to a predetermined location (i.e., a task performance location), and a reward attribute is therefore assigned to first client device 20A. In some embodiments, second client device 20B is determined to be located within the threshold distance of first client device 20A (i.e., at a corresponding task performance location), and a reward attribute is therefore assigned to second client device 20B. Stated another way, second client device 20B has implemented at least a part of an assigned task when it arrives at a location within the threshold distance of first client device 20A, and the reward attribute is granted for completing this part of the task. However, in some embodiments, client devices 20A and 20B can only receive their rewards, when both client devices 20A and 20B have been located at their respective task performance locations and complete their assigned task together.

In various embodiments of the application, when the two client devices 20 are close to each other, the presence notification messages would allow the users of the client devices learn the distance and/or the relative location of other friends that are close to them. Such a location tracking method 300 improves the bonds among correlated users of the client devices, and facilitates seamless integration of the virtual social network and the physical world. Thus, tasks in real life may be reliably managed based on the virtual social network.

For the purposes of managing tasks in real life, the computational device (e.g., a server 10 or a managing client device 20) identifies a task, and a user of a client device would be assigned to implement at least a part of the task in real life. In some embodiments, the task is initiated by a user who logs into a user account of a software application on a specific client device. This user account is optionally an administrative user account, a certified user account or a regular user account. In some embodiments, the task is initiated by a user account that satisfies specific task initiation requirements. For example, the user account has to reach a predetermined user level before it has the authority to assign a task. When a user of another client device accepts the task on another user account, the client device and/or the user account that accepts the task is associated with the task, and corresponding information concerning the client device and/or the user account that accepts the task is tracked by the computational device.

For convenience of discussion in the present application, a user assigns a task from a managing user account on a computational device, and the computational device is optionally a server 10 or a managing client device 20. Another user (e.g., a first user) accepts the task on another user account (e.g., a first user account) on another client device 20 (e.g., first client device 20A). In some embodiments, a predetermined region is defined with respect to a specific location when the task is initially assigned by the computational device. The predetermined region is associated with a task performance location. In accordance with first client device 20A that accepts the task moves into the predetermined region, the computational device sets a reward attribute to the corresponding first user account. Specifically, in some embodiments, the first user account is awarded with a higher experience level, a higher skill level or some virtual goods.

In some embodiments, in addition to sharing the geographical location information of a client device 20, the computational device receives an image uploaded by the client device 20, and makes a comparison between the received image and a predetermined image to obtain a similarity score between the received image and the predetermined image. The computational device further determines that the similarity score exceeds a threshold similarity, and thereby, modifies the reward attribute of the user account of the user who has completed the task.

In some embodiments, the predetermined image and characteristic data of the predetermined image are stored in the computational device in advance. The predetermined image is optionally associated with the task performance location associated with the assigned task. For example, the task is to visit a tourist attraction, and the predetermined image is an image associated with the tourist attraction. Further, when the computational device receives an image from the client device 20 that accepts the task, characteristic data of the received image are extracted and compared to the characteristic data of the predetermined image to result in the similarity score. If the similarity score is greater than the threshold similarity, the received image is determined to be properly associated with the predetermined image. Then, if the location of first client device 20A is also determined to be located within the predetermined region, the computational device is able to determine that the first user has finished the assigned task at the designated task performance location. Accordingly, the reward attribute of the first user is updated by the computational device.

Further, in some embodiments, the computational device receives barcode information rather than an image from the client device 20 that accepts a task. The computational device determines whether the received barcode information is consistent with predetermined barcode information stored in a memory of the computational device. If yes, then the reward attributes is improved for the user of the client device 20.

In some embodiments, the predetermined barcode information is associated with the task and can be obtained only at a task performance location associated with the assigned task when the task is completed. For example, in accordance with the task, the user has to go to a specific store to purchase a specific article, and the predetermined barcode information is printed on the specific article. Client device 20 that accepts the task scans the barcode and sends the barcode information to server 10. Server 10 determines whether the provided barcode information is consistent with the predetermined barcode information, and whether client device 20 is located within the predetermined region. In accordance with determinations of consistent barcode information and a proper client device location, it is determined that the user of client device 20 has arrived at the task performance location and purchased the specific article. The reward attribute of the first user is modified accordingly to reflect the completion of the assigned task.

Figure 4:
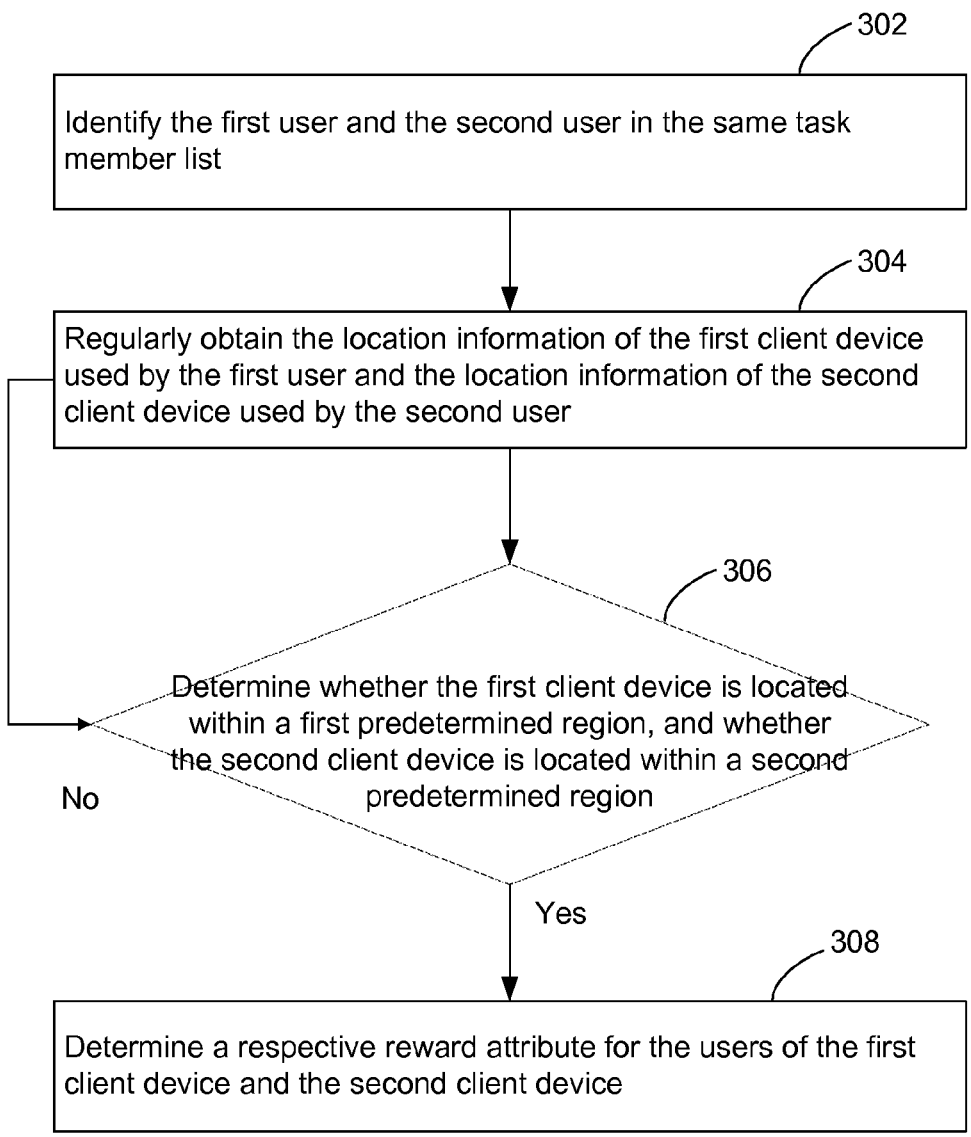
FIG. 4 illustrates a flow chart of another exemplary method for sharing locations of client devices in accordance with some embodiments.

FIG. 4 illustrates a flow chart of another exemplary method 400 for sharing locations of client devices in accordance with some embodiments. Method 400 is optionally performed by a computational device, such as a server 10 and a managing client device 20. Step 302, the computational device identifies a task in a task list. The identified task is associated with a first user and a second user who are further associated with a first user account and a second user account, respectively. In some embodiments, the identified task of the task list is initiated by a user who logs into a user account on the computational device, and this user account is optionally an administrative user account, a certified user account or a regular user account. In some embodiments, each task is initiated by a user account that satisfies specific task initiation requirements. For example, the user account has to reach a predetermined user level before it has the authority to assign a task. When a user of another client device 20 accepts the task on another user account, client device 20 and/or the user account that accepts the task is associated with the task, and corresponding information concerning client device 20 and/or the user account that accepts the task is stored in the computational device.

In some embodiments, when a first user of a first client device accepts a task, the first user shares the task with his or her friend (e.g., the second user). The first client device sends information of the task and information of the first user to server 10. Sever 10 identifies the second user that has a friend relationship with the first user, identifies the second client device corresponding to the second user, and then sends the information of the task to the second client device. The second user accepts the task on second client device 20, and sends an acknowledgement message to server 10. Server 10 then associates the second user account and/or the second client device with the task as well.

At Step 304, the computational device obtains the location information of first client device 20A corresponding to the first user and the location information of second client device 20A corresponding to the second user at regular intervals.

In some embodiments, server 10 obtains the location information of first client device 20A corresponding to the first user at regular intervals and sends the location information of first client device 20A to second client device 20A for real time display. Server 10 also obtains the location information of second client device 20A corresponding to the second user at regular intervals and sends the location information of second client device 20A to first client device 20A for real time display. As such, both first client device 20A and second client device 20A may display the other client device's location on a map in real time.

At Step 306, it is determined whether the location of first client device 20A is within a first predetermined region, and whether the location of second client device 20A is within a second predetermined region. Optionally, the first and second predetermined regions are identical or distinct. When the first client device or the second client device is not located in the respective predetermined region, location information of the first and second client devices 20 are updated as shown in Step 304, until both the first and second client devices 20 are located within their respective predetermined regions. Then, at Step 308, reward attributes are determined the first user of the first client device and the second user of the second client device.

In some embodiments, server 10 associates information of the predetermined regions with the task. Each predetermined region is further associated with a user and a user account that accepts the task. To complete the task, the respective user of the corresponding client device has to visit a task performance location that is related to the respective predetermined region. When the locations of the first and second client devices obtained by server 10 are within the respective predetermined region associated with the task, it is thereby determined that the users who accept the task have arrived at their task performance locations. Optionally, when the task is completed, and the reward attributes of the first user and the second user are modified accordingly. However, if there is a user who does not arrive at the task performance location, server 10 continues to obtain and update the location information of first client device 20A or second client device 20A in real time until both first client device 20A and second client device 20A arrive at their designated task performance locations.

In some embodiments, geographical locations of client devices 20 are used to manage tasks or play games in real life. Images are uploaded by first client device 20A and second client device 20, and compared with one or more predetermined images that are stored in the computational device that supports the tasks or games. A respective similarity score is calculated between each uploaded image of a client device and the corresponding predetermined image. In accordance with a determination that the respective similarity score exceeds a threshold similarity, a reward attribute associated with the corresponding user account and client device is updated. Stated another way, the similarity between the respective uploaded image and the corresponding predetermined image is confirmed based on a satisfactory similarity score, which indicates that the user of the corresponding client device has implemented the assigned task successfully. Thus, a bonus is awarded to the corresponding user account on the client device.

In some embodiments, the predetermined image and characteristic data corresponding to the predetermined image are stored in server 10. When a user arrives at a task performance location, the user captures an image using a built-in camera of the client device 20 and uploads the image to server 10. After receiving the image, server 10 extracts the characteristic data in the image, compares the extracted characteristic data to the characteristic data corresponding to the predetermined image, and obtains a similarity score between the captured image and the predetermined image. If the similarity score is greater than the threshold similarity, it is determined that the image uploaded by the client device 20 (e.g., first client device 20A and second client device 20B) is substantially similar to the predetermined image, and that the user of this client device has completed the assigned task. In some embodiments, only when all the users who have accepted the task have completed their assigned part of the task, server 10 updates the reward attributes for the user accounts of these users.

In some embodiments, barcode information is uploaded to the computational device by first client device 20A and second client device 20B. The uploaded barcode information is then compared with predetermined barcode information to determine whether they match each other. If yes, a corresponding reward attribute is updated for the user account that controls the first or second client devices.

In a specific example, as shown above in FIG. 1A, a plurality of users are involved to implement one or more tasks in a task list, wherein a first user uses first client device 20A, a second user uses second client device 20B, and a Nth user uses Nth client device 20N. Client devices 20 (including client devices 20A, 20B, . . . and 20N) are communicatively coupled to server 10 and to each other via one or more networks 30. In some embodiments, the one or more tasks in a task list are regarded as subtasks of a large-scale task. In some embodiments, when a computational device assigns a task to a client device 20, it transfers a predetermined image associated with the task performance location or the task to the client device 20, such that the predetermined image acts as a reference to guide the user to the task performance location.

Upon receiving a task, each user arrives at a task performance location, and the corresponding location information is updated to the computational device (such as server 10 or another managing client device 20). In some embodiments, each client device 20 regularly uploads its location information to server 10, and server 10 further sends the location information to other client devices 20. In some embodiments, each client device 20 directly updates its location information to another specific client device 20. By these means, client device 20 is configured to display the locations of other client devices 20 on an electronic map, and the users may learn the locations of other users who are assigned to the same task or different tasks on the task list on the electronic map in real time.

Further, in some implementations, when a user arrives at a task performance location, his or her client device 20 not only provides the location information, but also uploads an image captured at the task performance location to the computational device that assigns the task. The computational device determines whether the uploaded image is substantially similar to the predetermined image and whether the user of the client device is located within a predetermined region. In some embodiments, only when the uploaded image is substantially similar to the predetermined image and the user of the client device is located within the predetermined region, the computational device confirms that the user has completed the assigned task. Further, in some embodiments, when the computational device determines that all users have completed the tasks of the task list, reward attributes of the corresponding user accounts of these users are updated, i.e., these users are rewarded with bonuses.

It should be noted that the task in the embodiment of the application may be assigned in a variety of forms. In some embodiments, one task is assigned to a user of a client device 20, and implemented by this user of the client device 20 independently. In some embodiments, a task is assigned to a plurality of users each associated with at least one client device. Optionally, the plurality of users are required to complete subtasks of the task at different locations. Optionally, a first group of users of the plurality of users are assigned to arrive at specific task performance locations, while a second group of users of the plurality of users are assigned to prevent the some users from arriving at the specific task performance locations. Optionally, the plurality of users arrives at a designated task performance location by relays.

Each of methods 110, 200, 300 and 400 is optionally governed by instructions that are stored in a non-transitory computer readable storage medium and that are executed by one or more processors of a computational device (e.g., server 10 or client device 20). Each of the operations shown in FIGS. 1B-1D and 2-4 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in methods 110, 200, 300 and 400 may be combined and/or the order of some operations may be changed.

It should be understood that the particular order in which the operations in FIGS. 1B-1D and 2-4 have been described are merely exemplary and are not intended to indicate that the described order is the only order in which the operations could be performed. One of ordinary skill in the art would recognize various ways to cache and distribute specific data as described herein. Additionally, it should be noted that details of processes described herein with respect to method 110, 200, 300 and 400 (e.g., FIGS. 1B-1D, 2, 3 and 4) are applicable in an analogous manner to each other as described above. For brevity, these details are not repeated here.

Figure 5A:
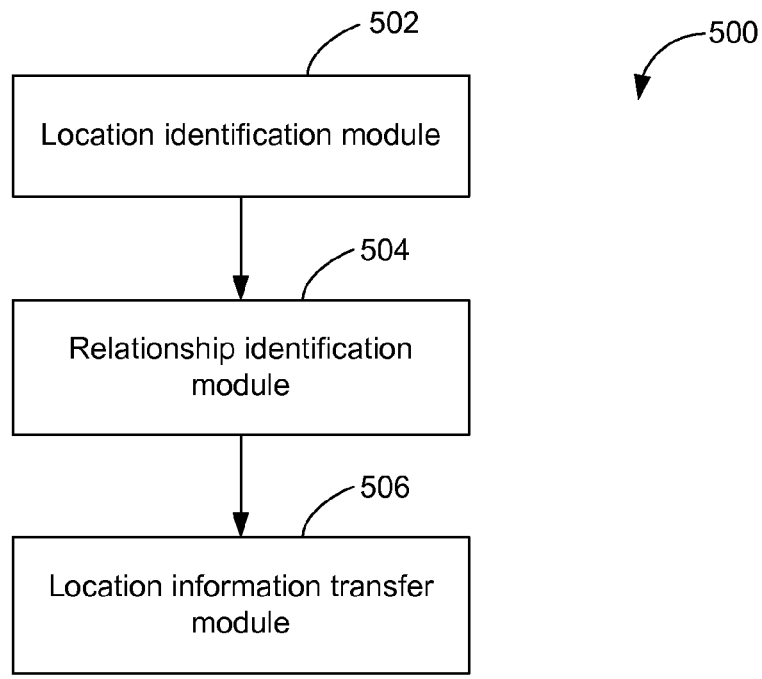
FIGS. 5A-5D illustrate four block diagrams of location based task management systems that share geographical location information of client devices in accordance with some embodiments.

FIGS. 5A-5D illustrate four block diagrams of exemplary location based task management systems 500 that share geographical location information of client devices in accordance with some embodiments. As shown in FIG. 5A, location based task management system 500 includes location identification module 502, relationship identification module 504 and location information transfer module 506. Location identification module 502 obtains the location information of first client device 20A at regular intervals or upon receiving a request. First client device 20A implements a software application (e.g., a social network platform) on which a first user logs into a first user account. Relationship identification module 504 identifies a second client device 20B that is controlled by a second user who logs into a second user account on the same software application. Second client device 20B is identified based on a predetermined relationship between the first and second users. Location information transfer module 506 sends the location information of first client device 20A to second client device 20B, such that second client device 20B may display the location information of first client device 20A or corresponding locations of first client device 20A in real time. In some embodiments, location based task management system 500 is included in a server, and the server acts as an intermediate device that collects the location information of first client device 20A and passes it to second client device 20B.

In some embodiments, the location identification module 502 is used to obtain raw positioning information of first client device 20A at regular intervals using a specific technique (e.g., GPS positioning), and calculates the location information of the first user client device 20 (e.g., its longitude and altitude) based on the raw positioning information of the first user client device 20.

Figure 5B:
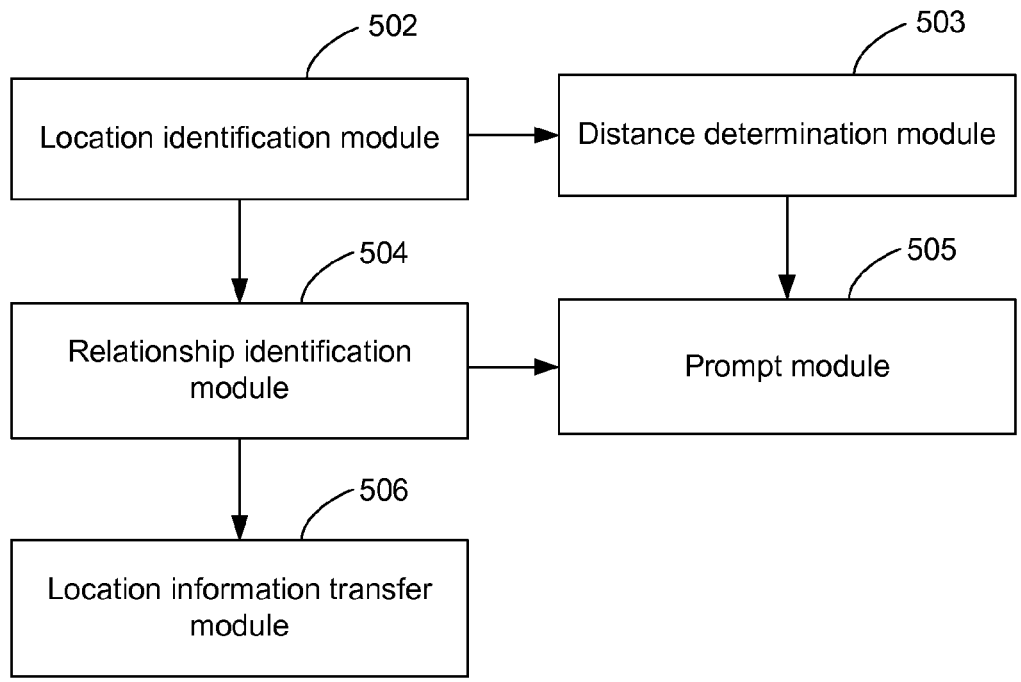

Further, as shown in FIG. 5B, location based task management system 500 further includes a distance determination module 503 and a prompt module 505. Distance determination module 503 calculates the distance between two client devices based on location information obtained from these two client devices. Prompt module 505 generates presence notification messages, when the distance between two client devices is less than a threshold distance, and sends a respective presence notification message to notify each client device of the presence of the other client device.

In some embodiments, distance determination module 503 is also used to determine a relative location between two client devices based on their location information, and the presence notification messages includes both the distance between these two client devices and information of the relation location between them.

In some embodiments, relationship identification module 504 identifies that a first user of a first client device 20A and a second user of a second client device 20B have a predetermined relationship. In accordance with identification of the predetermined relationship, prompt module 505 sends out the presence notification messages to indicate that the distance between two client devices is less than the threshold distance.

Figure 5C:
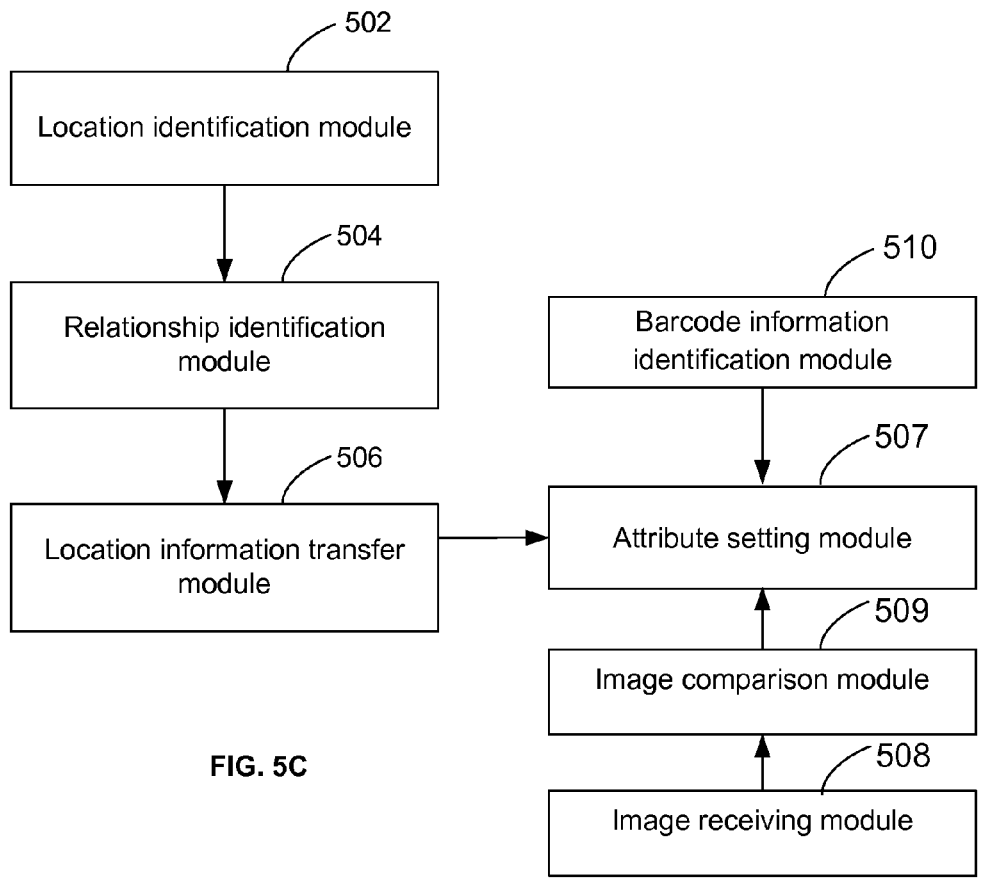

As shown in FIG. 5C, in addition to modules 502-506, location based task management system 500 optionally includes reward attribute determination module 507 that determines whether a client device is located within a predetermined region based on the received location information of the client device, and accordingly modifies a reward attribute of the user of the client device when a reward criterion is satisfied.

In some embodiments, the reward criterion is determined based on an image received from the client device. Specifically, in some implementations, location based task management system 500 further includes image receiving module 508 for receiving the image provided by first client device 20, and image comparison module 509 for comparing the received image and a predetermined image and determining whether they are substantially similar to each other. In accordance with an exemplary reward criterion, attribute setting module 507 determines whether a corresponding similarity score that indicates the similarity of the received image and the predetermined image is greater than the threshold similarity, and accordingly modifies the reward attribute associated with the user of the client device.

In some embodiments, the reward criterion is determined based on barcode information received from the client device. Specifically, in some implementations, location based task management system 500 further includes a barcode information receiving module 510 that receives the barcode information uploaded by first client device 20. Attribute setting module 507 determines whether the received barcode information matches predetermined barcode information, and accordingly modifies the reward attribute corresponding to the first user of the client device.

Figure 5D:
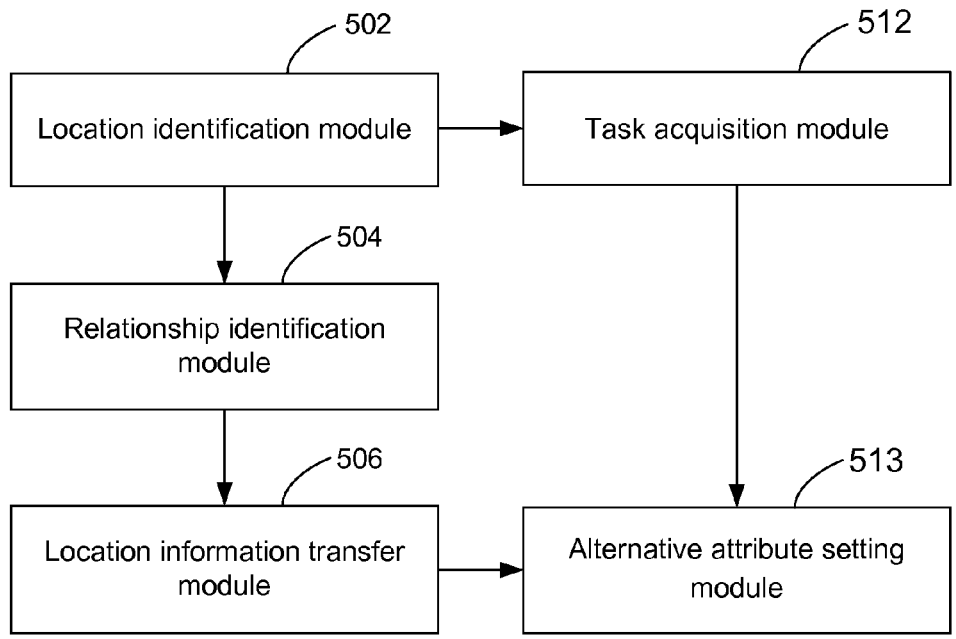

Further, as shown in FIG. 5D, in some embodiments, location based task management system 500 optionally includes a task identification module 512 for identifying task information. The task information includes information of a task performance location, and information of the first user and the second user that are both assigned to implement a specific task. Location based task management system 500 further includes an alternative attribute setting module 513 that determines whether a geographical location of first client device 20A is within a first predetermined region, and whether a geographical location of second client device 20A is within a second predetermined region. In accordance with such determinations, alternative attribute setting module 513 then modifies the reward attributes of the first user and the second user based on their geographical locations.

Figure 6:
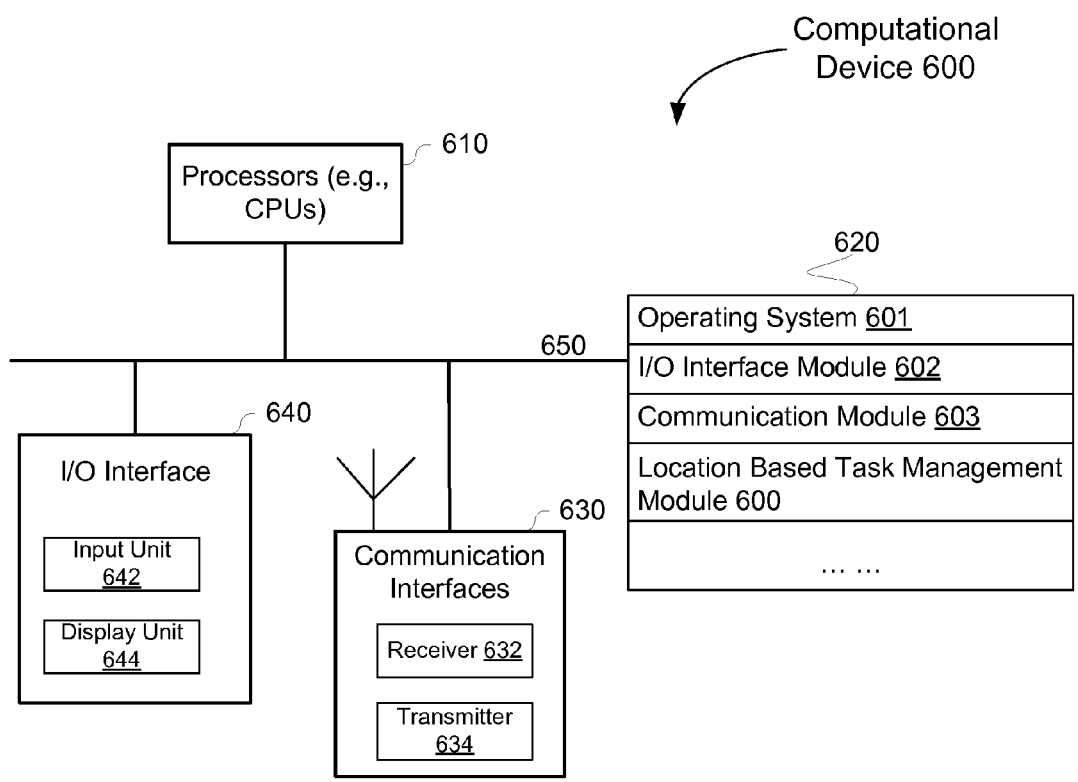
FIG. 6 illustrates a block diagram of an exemplary computational device that receives location information of one or more client devices according to some embodiments of the application.

FIG. 6 illustrates a block diagram of an exemplary computational device 600 (e.g., server 10 or client device 20) that receives location information of one or more client devices 20 according to some embodiments of the application. In some implementations, computational device 600 at least includes one or more processors 610 (e.g., central processing units) and a memory 620 for storing data, programs and instructions for execution by one or more processors 610. In some implementations, computational device 600 further includes one or more communication interfaces 630, an input/output (I/O) interface 640, and one or more communication buses 650 that interconnect these components.

In some embodiments, I/O interface 640 includes an input unit 642 and a display unit 644. Examples of input unit 642 include a keyboard, a mouse, a touch pad, a game controller, a function key, a trackball, a joystick, a microphone, a camera and the like. Additionally, display unit 644 displays information that is inputted by the user or provided to the user for review. Examples of display unit 644 include, but are not limited to, a liquid crystal display (LCD) and an organic light-emitting diode (OLED) display. In some implementations, input unit 642 and display unit 644 are integrated on a touch-sensitive display that displays a graphical user interface (GUI).

In some embodiments, communication buses 530 include circuitry (sometimes called a chipset) that interconnects and controls communications between system components. In some embodiments, communication interfaces 630 further include a receiver 632 and a transmitter 634.

In some embodiments, memory 620 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 620 includes one or more storage devices remotely located from the one or more processors 610. In some embodiments, memory 620, or alternatively the non-volatile memory device(s) within memory 620, includes a non-transitory computer readable storage medium.

In some embodiments, memory 620 or alternatively the non-transitory computer readable storage medium of memory 620 stores the following programs, modules and data structures, instructions, or a subset thereof:
  Operating System 601 that includes procedures for handling various basic system services and for performing hardware dependent tasks;
  I/O interface module 602 that includes procedures for handling various basic input and output functions through one or more input and output devices, wherein I/O interface module 602 further includes an interface display module that controls displaying of a graphical user interface;
  Communication module 603 that is used for connecting computational device 600 to other computational devices (e.g., servers and client devices), via one or more network communication interfaces 650 (wired or wireless) and one or more communication networks, such as the Internet, other wide area networks, local area networks, metropolitan area networks, and so on;
location based task management module 500 that assigns tasks to client devices and manages the assigned tasks based on location information received from a client device. In some embodiments, location based task management module 500 includes some of modules 502-513 as shown in FIGS. 5A-5D. More details on location based task management module 504 are explained above with reference to FIGS. 1A-1D, 2, 3, 4, and 5A-5D.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of managing a task based on geographical locations, comprising:
   at a computational device having one or more processors and memory storing program modules to be executed by the one or more processors:
      obtaining first location information concerning one or more geographical locations where a first client device has been located;
      obtaining second location information concerning one or more geographical locations where a second client device has been located;
      assigning a task to the first client device and the second client device according to the one or more geographical locations of the first client device and the one or more geographical locations of the second client device, the task including a predetermined task performance location for each client device;
      receiving a first message from each of the first and second client devices, wherein the first message includes third location information corresponding to a corresponding client device's predetermined task performance location and at least one additional information item captured by the corresponding client device at the predetermined task performance location after completing the task; and
      in accordance with a determination, from the first message, that both the first and second client devices are located at their corresponding predetermined task performance locations and complete the task together, determining a reward attribute for a user of each of the first and second client devices based on the third location information, the at least one additional information item and a duration of a time difference between the assignment of the task and the receipt of the first message.

2. The method of claim 1, further comprising:
   regularly receiving from the first client device an update of its current geographical location, wherein the progress of the task is further managed by monitoring the update of the current geographical location of the first client device.

3. The method of claim 2, wherein a subtask of the task is assigned to a second client device, further comprising:
regularly receiving from the second client device an update of its current geographical location; and
managing the progress of the task by monitoring the updates of the current geographical locations of the first client device and the second client device.

4. The method of claim 1, wherein the first and second client devices exchanges an information item that is selected from an information group consisting of a text message, a voice message, and a picture.

5. The method of claim 1, further comprising:
receiving first current location information concerning a current location of the first client device;
receiving second current location information concerning another current location of a second client device;
determining a distance between the first and second client devices based on the first and second current location information; and
managing the progress of the task based on the distance between the current locations of the first and second client devices and a predetermined relationship between users of the first and second client devices.

6. The method of claim 5, further comprising:
in accordance with a determination that the distance between the current locations of the first and second client devices is smaller than a threshold distance, sending a respective presence notification message to the first client device and the second client device to notify the respective device of the presence of the other device.

7. The method of claim 1, further comprising:
determining that the first client device is located within a first predetermined region according to the third location information received from the first client device;
determining that the second client device is located within a second predetermined region according to the third location information received from the second client device; and
managing the progress of the task by updating a respective reward attribute associated with each user of the first and second client devices in accordance with both a determination that the first client device is located within the first predetermined region and a determination that the second client device is located within the second predetermined region.

8. The method of claim 1, wherein determining the reward attribute for the user of the first client device further comprises at least one of the following operations:
determining that the duration of the time difference between the assignment of the task and the receipt of the first message satisfies a task completion time requirement.

9. The method of claim 1, wherein the at least one additional information item is selected from a message group consisting of a text message, a voice message, a barcode, a quick response (QR) code, and a picture.

10. The method of claim 1, wherein the at least one additional information item includes an image that is obtained at or near the task performance location, and determining the reward attribute for the user of the first client device further comprises:
comparing the image of the at least one additional information item with a specific image that is stored in a memory of the computational machine;
determining a similarity score based on the comparison; and
determining the reward attribute to the user of the first client user according to the similarity score.

11. The method of claim 1, wherein the at least one additional information item is associated with the quality of the task that has been completed by the user of the first client at task performance location.

12. The method of claim 1, wherein the computational device manages the task based on geographical locations on a social network platform.

13. A computational device, comprising:
one or more processors; and
memory having instructions stored thereon, which when executed by the one or more processors cause the processors to perform operations to:
obtain first location information concerning one or more geographical locations where a first client device has been located;
obtain second location information concerning one or more geographical locations where a second client device has been located;
assign a task to the first client device and the second client device according to the one or more geographical locations of the first client device and the one or more geographical locations of the second client device, the task including a predetermined task performance location for each client device;
receive a first message from each of the first and second client devices, wherein the first message includes third location information corresponding to a corresponding client device's predetermined task performance location and at least one additional information item captured by the corresponding client device at the predetermined task performance location after completing the task; and
in accordance with a determination, from the first message, that both the first and second client devices are located at their corresponding predetermined task performance locations and complete the task together, determine a reward attribute for a user of each of the first and second client devices based on the third location information, the at least one additional information item and a duration of a time difference between the assignment of the task and the receipt of the first message.

14. The computational device of claim 13, wherein the at least one additional information item is selected from a message group consisting of a text message, a voice message, a barcode, a quick response (QR) code, and a picture.

15. The computational device of claim 13, wherein the computational device manages the progress of the task based on geographical locations on a social network platform.

16. The computational device of claim 13, wherein the instructions stored on the memory, when executed by the one or more processors further cause the processors to perform operations to:
receive first current location information concerning a current location of the first client device;
receive second current location information concerning another current location of a second client device;
determine a distance between the first and second client devices based on the first and second current location information; and
manage the progress of the task based on the distance between the current locations of the first and second client devices and a predetermined relationship between users of the first and second client devices.

17. A non-transitory computer readable storage medium storing at least one program configured for execution by at least one processor of an electronic device, the at least one program comprising instructions to:
- obtain first location information concerning one or more geographical locations where a first client device has been located;
- obtain second location information concerning one or more geographical locations where a second client device has been located;
- assign a task to the first client device and the second client device according to the one or more geographical locations of the first client device and the one or more geographical locations of the second client device, the task including a predetermined task performance location for each client device;
- receive a first message from each of the first and second client devices, wherein the first message includes third location information corresponding to a corresponding client device's predetermined task performance location and at least one additional information item captured by the corresponding client device at the predetermined task performance location after completing the task; and
- in accordance with a determination, from the first message, that both the first and second client devices are located at their corresponding predetermined task performance locations and complete the task together, determine a reward attribute for a user of each of the first and second client devices based on the third location information, the at least one additional information item and a duration of a time difference between the assignment of the task and the receipt of the first message.

18. The non-transitory computer readable storage medium of claim 17, the at least one program further comprising instructions to:
- regularly receive from the first client device an update of its current geographical location, wherein the progress of the task is further managed by monitoring the update of the current geographical location of the first client device.

19. The non-transitory computer readable storage medium of claim 17, the at least one program further comprising instructions to:
- regularly receiving from the first client device an update of its current geographical location, wherein the progress of the task is further managed by monitoring the update of the current geographical location of the first client device.

20. The non-transitory computer readable storage medium of claim 17, wherein the first and second client devices exchanges an information item that is selected from an information group consisting of a text message, a voice message, and a picture.

* * * * *